United States Patent [19]

Babcock et al.

[11] Patent Number: 4,995,492

[45] Date of Patent: Feb. 26, 1991

[54] REUSABLE POSITION RETAINING STRAP FOR CLUTCH RELEASE MECHANISM

[75] Inventors: Bryce W. Babcock, Saline; Daniel F. Kiblawi, Rochester Hills; Eugene A. Wolbers, Northville, all of Mich.

[73] Assignee: Federal-Mogul Corporation, Southfield, Mich.

[21] Appl. No.: 418,615

[22] Filed: Oct. 10, 1989

[51] Int. Cl.⁵ ............... F16D 25/08; F16D 23/14; F15B 15/26; B65D 63/00
[52] U.S. Cl. ................. 192/85 CA; 192/91 A; 192/98; 92/23; 24/16 PB; 403/12
[58] Field of Search ............ 192/85 CA, 91 A, 98; 92/15, 23; 403/12, 405.1; 24/16 PB, 17 AP

[56] References Cited

U.S. PATENT DOCUMENTS

| | | |
|---|---|---|
| 4,454,632 | 6/1984 | Nix et al. .................. 24/16 PB |
| 4,581,979 | 4/1986 | Compton et al. ............. 92/23 |
| 4,585,108 | 4/1986 | Leigh-Monstevens ....... 192/85 CA |
| 4,665,802 | 5/1987 | Barker et al. .............. 92/23 |
| 4,708,228 | 11/1987 | Leigh-Monstevens ....... 192/85 CA |
| 4,766,804 | 8/1988 | Barker ...................... 92/23 |

Primary Examiner—Richard Lorence
Attorney, Agent, or Firm—Lawrence J. Shurupoff

[57] ABSTRACT

A reusable retaining strap (30) for holding a clutch release bearing (12) and actuator (11) together in a contracted position during shipment and installation. In one embodiment, a pair of elongated arms (48) are connected to opposite sides of a central ring (46) which is secured to a piston (38) of the actuator (11). In a second embodiment, the elongate arms (48) are separate members fixed at one end to the piston (38). In each case, the arms (48) include anchoring lugs (50) on their distal ends (51). The anchoring lugs (50) extend transversely relative to the length of the arms (48) and are releasably secured to a receptacle (53) formed on the housing (32) of the actuator (11).

19 Claims, 3 Drawing Sheets

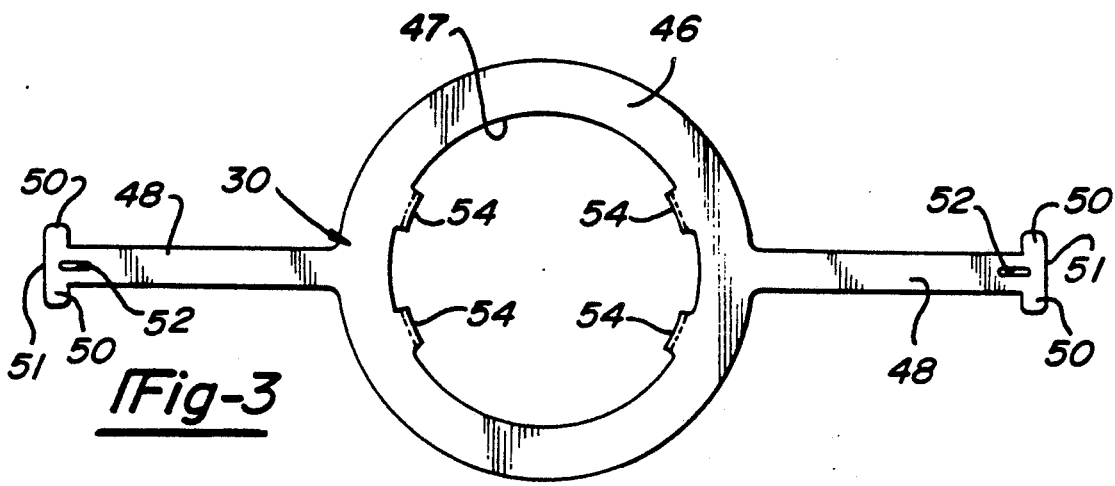
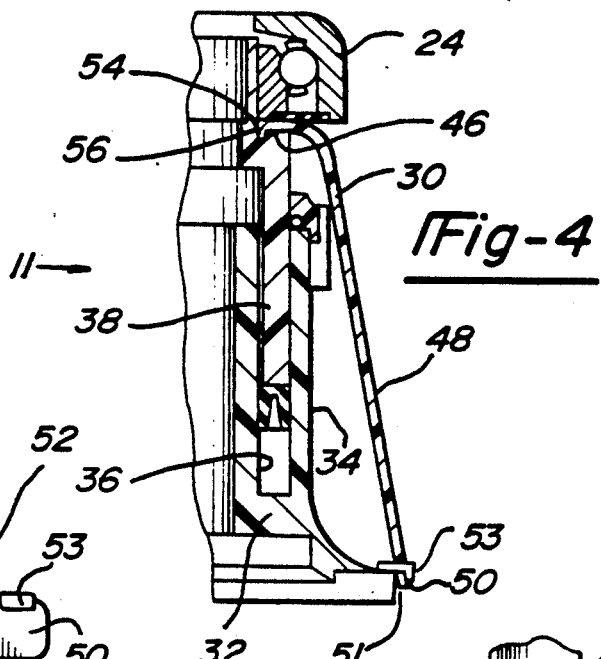
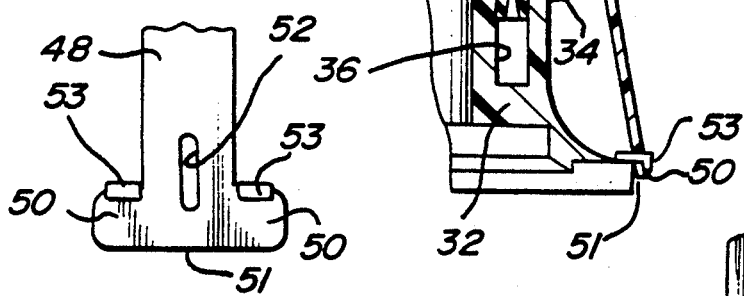
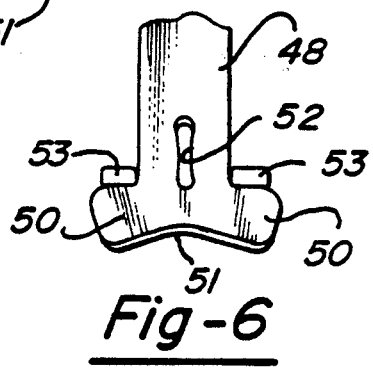
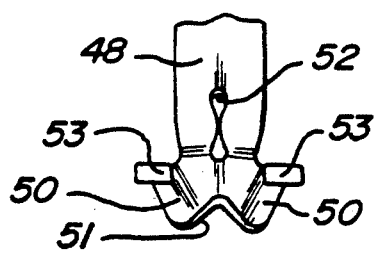

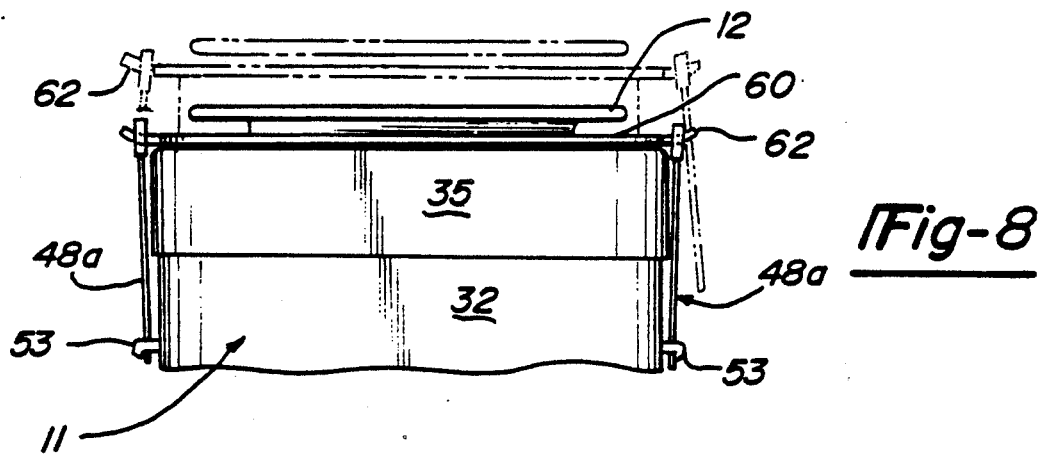
*Fig-8*
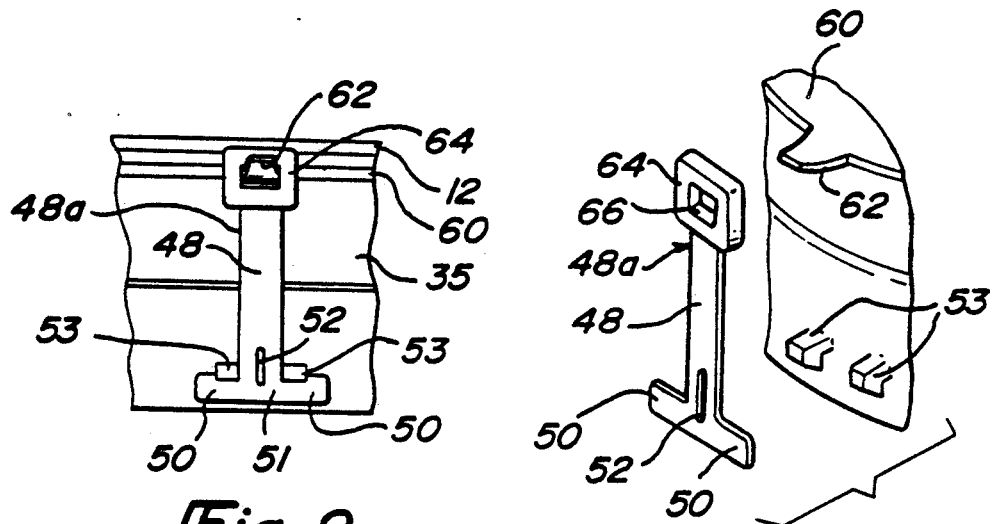
*Fig-9*
*Fig-10*
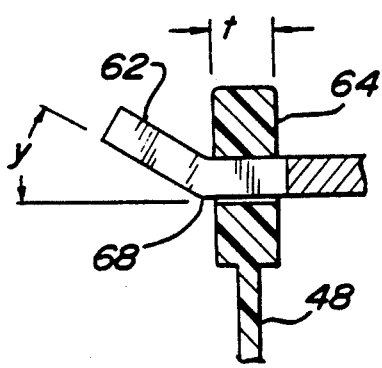
*Fig-11*

REUSABLE POSITION RETAINING STRAP FOR CLUTCH RELEASE MECHANISM

TECHNICAL FIELD

This invention relates to a strap for a clutch release bearing and a fluid pressure operated non-rotating cylindrical actuator. More particularly, it relates to a reusable strap for holding the bearing and actuator in a contracted position for shipment and installation.

BACKGROUND OF THE INVENTION

Hydraulically actuated clutch release bearing systems are presently coming into wide spread use in the automotive and light truck industry as an improvement over the conventional, all mechanical "cable" systems.

Some hydraulic clutch release systems are completely external of the bell housing, i.e. both the master cylinder and slave cylinder are outside the bell housing and the slave cylinder output member is mechanically connected to and/or acts upon a conventional clutch release bearing actuating fork located within the bell housing. The systems are generally referred to as "hang-on" systems.

Another system, generally known as the "concentric slave cylinder" or "CSC" system, locates the slave cylinder within the bell housing concentrically with the clutch axis. Among other advantages, it eliminates the need for the actuating fork. Such a system is shown in U.S. Pat. No. 4,620,625, assigned to the assignee of the present invention.

It is the latter system to which the present invention is most concerned, although it would offer certain similar advantages if used on the hang-on system. Both the CSC system and the hang-on system can be shipped to the point of installation as unfilled, or either can be pre-filled with hydraulic fluid, thereby avoiding the need to fill the system on the production line or thereafter.

In either case, whether filled or unfilled, the clutch release bearing and actuator are held together during shipment and installation by a strap which holds the actuator in a completely or partially contracted position. For convenience, it is normal to install the actuator while held in the contracted position. In certain applications, it may even be required where axial space limitations between the transmission and engine would otherwise preclude such installation. In current practice, after installation, the strap is either manually removed or broken upon initial operation of the hydraulic cylinder.

A problem with known prior art straps that are removed or broken after installation is that they are not reuseable if the hydraulically actuated clutch release bearing assembly must be removed for further repair or adjustment. Once the known prior art straps have been broken or removed, they serve no useful purpose. A single use retainer strap that only holds a hydraulic actuator in its contracted position during initial installation complicates reinstallation of the hydraulic clutch release bearing assembly.

SUMMARY OF THE INVENTION

According to the present invention, there is disclosed a reusable retaining strap for shipment and installation of a hydraulically actuated clutch release bearing assembly. The clutch release bearing assembly includes a housing defining a tubular cylinder and a movable piston received in the cylinder which forms the hydraulic actuator.

In one form of the invention, the retaining strap includes a central ring encircling a tubular piston and retained between the piston and the clutch release bearing. A plurality of elongate arms are connected to the central ring at spaced locations and extend radially outwardly from the ring. Anchoring lugs are formed on the arms at the opposite ends of the arms from the central ring and extend transversely relative to the length of the arms. The anchoring lugs are releasably secured to the housing. A unique feature of the present invention is the provision of means for providing bending relief in the anchoring lugs which allow the anchoring lugs to bend upon initial extension of the piston from the cylinder so that the arms may be released from the housing.

In a second form of the invention, the central ring is omitted and the two or more elongate arms are separate straps. Means are provided at the strap's forward end to affix it to the moveable bearing piston assembly. The anchoring lugs and distal end of each strap is constructed the same as the first mentioned embodiment.

According to one aspect of the present invention, the bending relief is provided by forming a region of reduced cross-sectional area on the arms adjacent the anchoring lugs. It is important that the region of reduced cross-sectional area is dimensioned to be durable enough to not break upon the initial extension of the piston from the cylinder. Instead, the region of reduced cross-sectional area permits the strap to bend allowing the anchoring lugs to shift position and release the arms from the housing. In a preferred embodiment, the means for providing bending relief comprises an elongated slot disposed partially between the anchoring lugs and extending in the same direction as the length of the arms.

The anchoring lugs extend from opposite sides of the arms in opposite directions perpendicular to the length of the arms. The anchoring lugs are received by a receptacle formed on the housing. The receptacle may be simply formed as a pair of prongs formed on the housing at its spaced locations corresponding to the location of the arms.

In the one-piece embodiment, the central ring of the strap is preferably received between the actuator and the clutch release bearing. The central ring preferably includes a plurality of tabs extending axially relative to the inner diameter of the ring. The tabs are intended to be received in corresponding slots formed in the piston. Further, the retaining strap is preferably symmetrical so that it may be installed on the piston in either one of two orientations.

A principal object of the present invention is to provide a position retaining strap for hydraulically actuated clutch release bearing assembly that may be reused if it is necessary to remove and reinstall the hydraulically actuated clutch release bearing assembly.

Another object of the invention is to provide a strap for a hydraulically actuated clutch release bearing assembly that may be reused four or five times if necessary. The resuable strap remains on the hydraulic actuator portion of the assembly and does not interfere with the operation of the clutch release bearing or actuator.

A further object of the invention is to provide a strap having a relieved portion which promotes bending at a desired location so that the strap bends as it is released from the actuator instead of breaking.

These and other objects and advantages of the present invention will become apparent to those skilled in the art when the following description of examples of the best mode and embodiments for practicing the invention is read in conjunction with the accompanying drawings.

BRIEF DESCRIPTION OF THE DRAWINGS

FIG. 3 is a plan view of the position retaining strap of FIG. 1;

FIG. 4 is a fragmentary cross-sectional view of FIG. 1 showing the position retaining strap installed between the clutch release bearing and the actuator and holding the actuator in its contracted position;

FIG. 5 is a schematic fragmentary view of the distal end of the position retaining strap as it is retained by prongs on the housing;

FIG. 6 is a fragmentary schematic view similar to FIG. 5 showing the distal end of the strap as it begins to bend upon initial extension of the actuator;

FIG. 7 is a schematic fragmentary view similar to FIG. 5 showing the distal end of the position retaining strap just before release from the housing;

FIG. 8 is a side view of the forward end of a clutch release bearing assembly, similar to FIGS. 2 and 4, showing an alternative embodiment of the present invention wherein the retaining straps are separately constructed without an integral central ring portion;

FIG. 9 is plan view of one of retaining straps shown in FIG. 8;

FIG. 10 is an exploded fragmentary view of the retaining strap shown in FIG. 9 and the clutch bearing assembly prior to installation of the retaining strap on the assembly; and FIG. 11 is a fragmentary cross-sectional view of the forward end of the retaining strap as it is installed or retained on the clutch bearing assembly as shown in FIG. 9.

DETAILED DESCRIPTION OF THE PREFERRED EMBODIMENT

Figure 1:
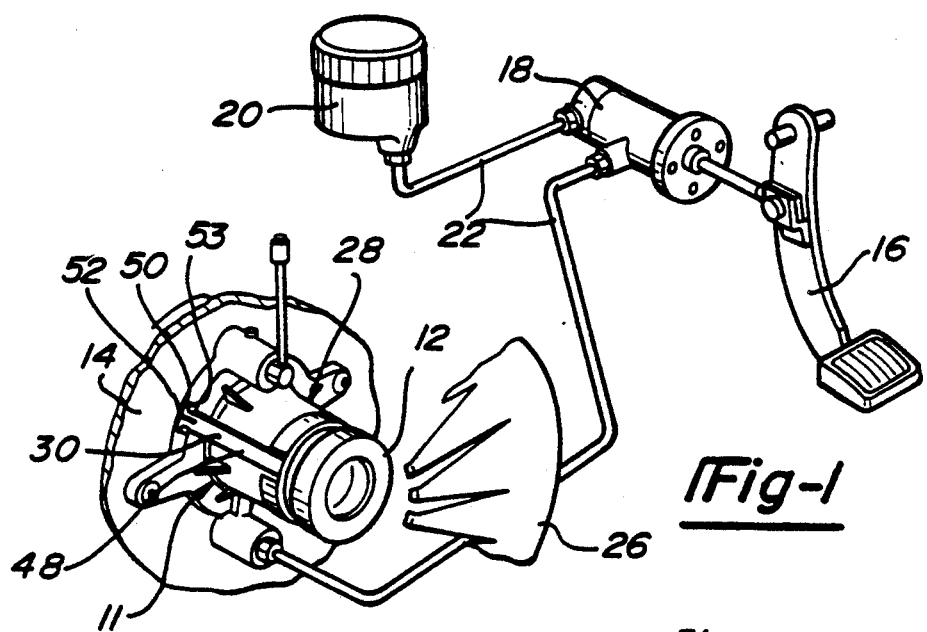
FIG. 1 is a pictorial view with some parts broken away showing a clutch system including the fluid actuated clutch release bearing assembly with a first form of the retaining strap of the present invention.

Referring now to FIG. 1, a hydraulic clutch system is shown schematically. The hydraulic clutch system includes a hydraulic linear actuator 11 and clutch release bearing 12 which are attached as a unit to the transmission casing 14 of a vehicle and concentrically located relative to the transmission input shaft (not shown). A foot pedal 16 displaces fluid from a master cylinder 18 to operate the hydraulic actuator 11.

A reservoir 20 contains fluid supplied to the master cylinder 18 as needed. Tubing 22 interconnects the master cylinder 18 with the hydraulic actuator 11 and the reservoir 20. The clutch release bearing 12 is adapted to contact the clutch spring plate 26.

The hydraulic actuator 11, or concentric slave cylinder as it is otherwise known, shifts the clutch release bearing 12 linearly along an axis X (see FIG. 2) which extends through the clutch release bearing 12 and the linear actuator 11. The clutch release bearing 12 and linear actuator 11 are held together during shipment and installation by a strap 30. As shown in FIG. 1, the strap 30 holds the hydraulic actuator 11 and clutch release bearing 12 in their contracted position.

Figure 2:
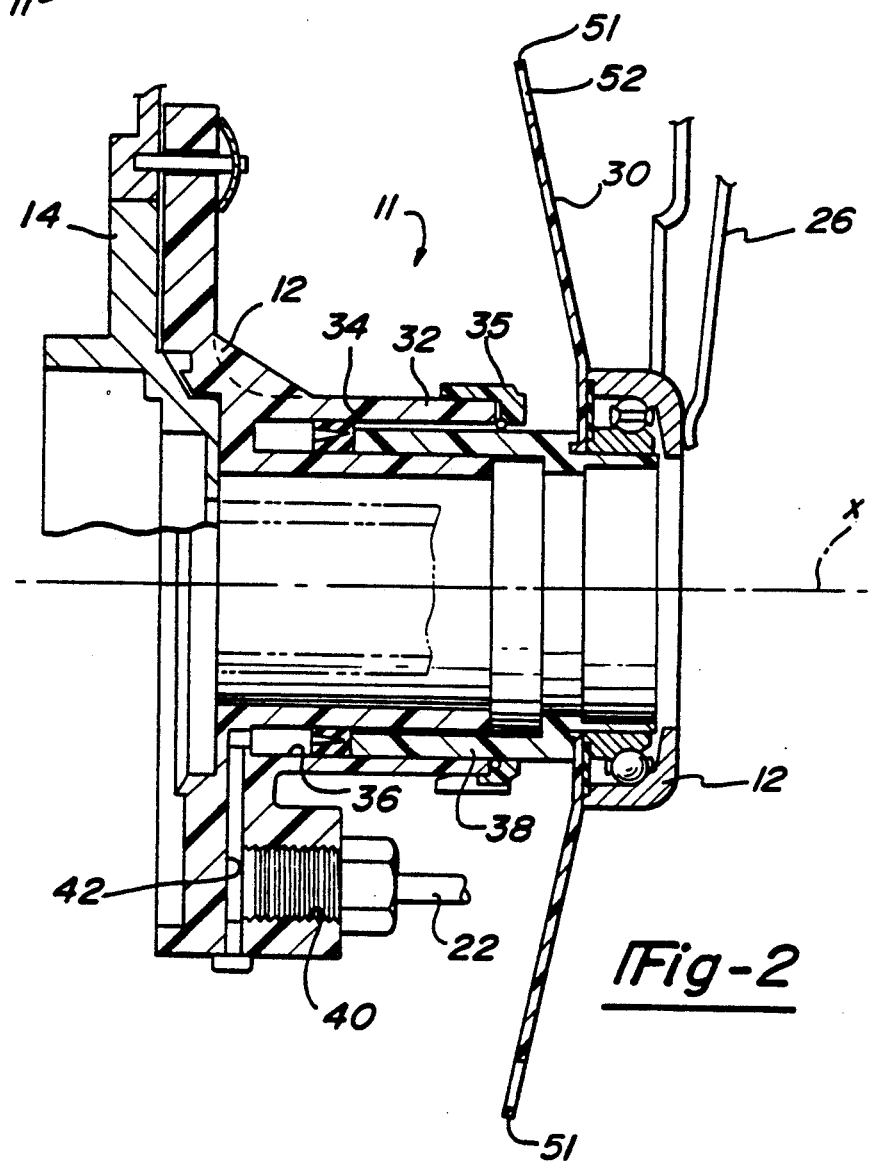
FIG. 2 is a sectional view partially broken away, of the clutch release bearing assembly with the position retaining strap of FIG. 1 in its released position.

In FIG. 2, the hydraulic actuator 11 and clutch release bearing 12 are shown in greater detail. A housing 32 of the actuator 11 is shown attached to a portion of the transmission casing 14. The housing includes a cylindrical portion 34 which defines a cylindrical cavity 36. A tubular piston 38 is received for reciprocating movement in the cylindrical cavity 36.

The piston 38 is moved in the cylindrical cavity 36 by the supply or withdrawal of fluid through the port 40. The port 40 is connected to the cylindrical cavity 36 by means of an integrally formed conduit 42 in the housing 32. An annular seal or dust cap 35 is provided at the end of the housing 32, the inner seal portion of which engages piston 38 to preclude entry of dust or other contaminants.

The strap 30 as shown in FIG. 2 is in its released position. Upon initial extension of the linear actuator, the strap 30 is carried by the piston and disengaged from the housing of the linear actuator 28 in a manner described below.

Referring now to FIG. 3, the strap 30 is shown to include a central ring 46 having an inner diameter 47. Elongated arms 48 extend from spaced locations on the central ring 46. In the illustrated embodiment, two arms 48 are provided at diametrically opposite locations on the central ring 46. Anchoring lugs 50 are formed on the distal ends 51 of the arms 48. The arms 48 include preferential flexing regions, or slots 52, for providing bending relief which allows the anchoring lugs 50 to shift position relative to each other when the piston is initially extended from the cylinder portion 34. In the illustrated embodiment, the means for providing bending relief includes an elongated slot 52. Receptacle means or prongs 53 are formed at spaced locations on the housing 32 corresponding to the point on the housing to which the distal ends 51 of the arms 48 align with the housing when the linear actuator 11 is in its contracted position.

Referring now to FIG. 4, the central ring 46 is retained on the piston both initially and after initial actuation of the linear actuator 11. Axially extending arcuate tabs 54 are formed on the inner diameter 47 of the central ring 46. The arcuate tabs 54 are received in slots 56 formed in the piston. The central ring 46 is thus trapped between the piston 38 and the clutch release bearing 24 which holds the strap 30 in place.

Referring now to FIGS. 5-7, release of the distal ends 51 of the arms 48 from the housing 32 will be explained in sequence. In FIG. 5, a distal end 51 is shown with the anchoring lugs 50 engaging the prongs 53 of the housing 32. The elongated slot 52 is substantially undistorted.

In FIG. 6, as the linear actuator begins its initial extension, the distal end 51 of the arm 48 begins to bend with the anchoring lugs 50 shifting toward each other. The elongated slot 52 flexes inwardly to facilitate bending of the anchoring lugs 50 toward each other.

Referring now to FIG. 7, the further extension of the linear actuator results in the distal end being distorted until the anchoring lugs 50 will disengage the prongs 53. The elongated slot 52 essentially collapses to permit the anchoring lugs 50 to pass by the prongs 53 without being torn from the distal end 51 of the arm 48.

The means for providing bending relief might alternatively take the form of merely a groove or splitting the ends of the arms 48 thereby permitting the anchoring lugs 50 to bend (or overlap one another) without breaking as the arms are released from the housing 32. Another alternative manner of providing bending relief at the distal end 51 of the arm 48 includes axially grooving either one or both sides of the arm 48 between the anchoring lugs 50. The slot 52 inboard of the distal end 51 is preferred however, since the resistive strength and general relative orientation of the anchoring lugs 50 are better maintained when the distal end portion 51 from one lug 50 to the other lug 50 is left intact.

If it is necessary to remove the hydraulic actuator and clutch release bearing assembly 12 from the transmission casing 14, the distal ends 51 of the arms 48 may be aligned with the prongs 53 and resecured thereto to hold the hydraulic actuator and clutch release bearing assembly 12 in its contracted position. The elongated slot 52 may be engaged by a tool to aid in resecuring the distal ends 51 of the arms 48 to the housing 32.

In FIGS. 8-11, there is shown an alternative to the one-piece retaining strap described above. The alternative includes using one or more individual elongate arms. In other words, the central ring 30 is eliminated. This has the advantage of savings on material. Use of the alternative embodiment is basically independent of the clutch release bearing assembly being retained. As described below, where the elements or features of the elements are the same as those described in FIGS. 1-7, like reference numerals are used, or where the same element as previously described is used, but in slightly modified manner the suffix "a" is used to so indicate.

In FIG. 8, there is shown a hydraulic actuator 11 including an annular housing 32 and a clutch release bearing 12 and piston (not shown) assembly concentrically and reciprocally mounted within the housing 32. An annular dust cap 35 is mounted on the housing 32 at its forward end to preclude dust and other contaminants from entering the clearance between the piston and the annular cavity within the housing in which the piston reciprocates. Located concentrically with and extending radially from the clutch release bearing is an annular plate 60 having two diametrically opposed tangs 62 provided at its outer periphery. At its inner diameter, the plate 60 is secured to the bearing-piston assembly in an appropriate manner. For most specific details of this particular clutch release bearing actuator assembly, one may refer to copending U.S. patent application Ser. No. 238,650 now U.S. Pat. No. 4,938,332 assigned to the assignee of the present invention, the details of which are incorporated herein by reference.

Receptacle means or prongs 53 are formed at spaced locations on the housing 32 for the same purpose as earlier described.

Each retaining strap 48a comprises an elongate arm 48. The distal end 51 of elongate arm 48 is constructed in the same manner as earlier described including the provision of anchoring lugs 50 and slot 52 for purposes as earlier described.

The difference between the one-piece retaining strap 30 of the first embodiment from strap 48a of this second embodiment centers around the manner in which the retaining strap 48a is anchored to the clutch release bearing-piston assembly. The retaining strap 48a includes at its forward end a head portion 64 having an aperture 66 adapted to be slipped over the tang 62 of annular ring 60. The head 64 is shown to be rectangular shaped although this is by no means required. The opening 66 is likewise rectangularly shaped in dimensioned so as to closely match the cross-sectional configuration of tang 62 over which it is placed.

Further, the tang 62 is bent at elbow 68 midway of its radial length at an acute angle Y. The head 64 is of a cross-sectional thickness t greater than that of the remainder of elongated arm 48. The purpose of configuring the head 64 and tang 62 in such a manner as to provide a convenient means by which the elongate arm 48a can be installed upon and permanently secured to the tang 62 of annular ring 60.

By exerting relatively little force, the head portion can be stretched over elbow 68 of tang 62. However because of the relative thickness t of head portion 64, the aperture 66 will retain its shape, even after first actuation of the clutch assembly which acts to pull the anchoring lugs 50 past the housing prongs 53 in the manner earlier described. Further, once released from prongs 53, the retaining strap 48a cannot, simply by its own weight, slip off the tang 62.

In all other aspects, the above-described alternative reusable retaining straps 30 and 48a are the same and the description of one serves as the description of the other.

It will be readily appreciated that the above described structures for a retaining strap permit easier removal of the hydraulic actuator and clutch release bearing assembly and reinstallation if it is necessary to provide further service on a transmission after the hydraulic actuator and clutch release bearing assembly have been installed and operated. The reusable retaining strap 30 and 48a of the invention is simply constructed and provides for reuse with little or no additional cost. The one-piece strap 30 is symmetrical to permit installation in different orientations without affecting the operation of the strap.

While it will be apparent that the preferred embodiments of the invention disclosed satisfy the objects of the invention, it will be appreciated that the invention may be modified or varied without departing from the proper scope or fair meaning of the invention.

What is claimed is:

1. A reusable retaining strap for shipment and installation of a hydraulic actuator and clutch release bearing assembly having a housing defining a cavity and a movable piston received in the cavity, said strap being unbreakable by movement of said piston and comprising:
   at least one arm member including means at its forward end for connecting said arm member to said movable piston;
   reusable anchoring lugs provided on said arm member at its distal end for connecting said arm member to said housing both before and after operation of said clutch release bearing assembly; and
   said arm member having preferential flexing regions at said distal end for providing bending relief, said flexing regions being unbreakable by movement of said piston so as to allow said anchoring lugs to shift position relative to each other upon extension of the piston from said cavity to release said arm member from said housing without breaking said strap.

2. The retaining strap of claim 1 wherein said flexing region is formed by providing a region of reduced cross-sectional area on said arm member in comparison to the cross-sectional area of the arm member intermediate said forward end and said anchoring lugs wherein said region of reduced cross-sectional area is dimensioned to not break upon said initial extension of said piston from said cavity.

3. The retaining strap of claim 1 wherein said flexing region comprises an elongate slot disposed partially between said anchoring lugs.

4. The retaining strap of claim 1 wherein said anchoring lugs extend from opposite side portions of said arm member.

5. The retaining strap of claim 1 wherein said elongated arm member includes a head portion at said forward end, said head portion being of greater thickness than the remainder of said retaining strap and including a sized opening of predetermined dimension adapted to be force fitted upon a retention member located on said moveable piston.

6. The retaining strap of claim 1 in combination with said hydraulic actuator and said clutch release bearing assembly wherein said housing includes a pair of prongs which receive said anchoring lugs of said arm member.

7. The combination of claim 6 wherein said anchoring lugs extend from opposite side portions of said arm member in opposite directions, said flexing regions comprising elongated slots formed proximate said anchoring lugs.

8. The combination of claim 6 wherein said moveable piston includes retention means for retaining said arm member at said forward end, said arm member including a head portion at said forward end, said head portion and said retention means being in interfering engagement such that said retaining strap can be fitted to said moveable piston by manually forcing said retaining strap upon said retention means such that said retaining strap will be permanently secured to said piston until manually removed by force.

9. A reusable retaining strap for shipment and installation of a hydraulic actuator and clutch release bearing assembly having a housing defining a cavity and a moveable piston received in the cavity, said strap being unbreakable by movement of said piston and comprising:
    a central ring adapted to engage said piston;
    a plurality of arms connected to said central ring at spaced locations and extending radially outwardly from said ring and terminating at distal end portions;
    reusable anchoring lugs provided on said arms, said anchoring lugs being releasably securable to receptacles formed on said housing both before and after operation of said clutch release bearing assembly; and
    said arms having preferential flexing regions at said distal end portions for providing bending relief, said flexing regions being unbreakable by movement of said piston so as to allow said anchoring lugs to shift position relative to each other upon extension of said piston from said cavity to release said arms from said housing without breaking said strap.

10. The retaining strap of claim 9 wherein said central ring has an inner diameter which is adapted to be fitted over said piston, said central ring having a plurality of tabs extending axially relative to said inner diameter and formed on said inner diameter, said tabs each being adapted to be received in a corresponding slot formed in said piston.

11. In a system for actuating a clutch release bearing by axial movement of an actuating member rotatable about a clutch axis by engagement with a clutch release bearing, a fluid actuated clutch release bearing assembly having a central axis and being supported with said central axis generally in line with the clutch axis, said clutch release bearing assembly including a housing member having an annular, axially extending cylindrical portion defining a cylindrical cavity, a generally tubular piston received in said cylindrical cavity for reciprocation along said central axis in response to application of fluid pressure in said cylindrical cavity, a reusable retaining strap for shipment and installation of the clutch release bearing and actuating member, said retaining strap having a central ring encircling the tubular piston and a pair of elongated arms connected to the central ring at spaced locations and extending radially outwardly from the ring, reusable anchoring lugs at the opposite ends of the arms from the central ring, said anchoring lugs extending transversely relative to the length of the arms and being releasably securable to the housing both before and after operation of said clutch release bearing; and, means unbreakable by movement of said piston and formed on the arms for providing repetitive bending relief and allowing said anchoring lugs to shift position relative to each other upon extension of the piston from the cylindrical cavity to release the arms from the housing without breaking said strap.

12. The retaining strap of claim 11 wherein said means for providing bending relief comprises a region of reduced cross-sectional area of the arms intermediate the central ring and the anchoring lugs wherein said region of reduced cross-sectional area is dimensioned to not fracture upon initial extension of the piston from the cylindrical cavity.

13. The retaining strap of claim 11 wherein said means for providing bending relief comprise elongated slots disposed partially between the anchoring lugs and extending in the same direction as the length of the arms.

14. The retaining strap of claim 11 wherein said anchoring lugs extend from opposite sides of said arms in opposite directions perpendicular to the length of said arms.

15. The retaining strap of claim 11 wherein the receptacles which receive the anchoring lugs of each arm comprise a pair of prongs formed on the housing member at a plurality of diametrically spaced locations corresponding to the location of said arms.

16. The retaining strap of claim 15 wherein said anchoring lugs extend from opposite sides of said arms in opposite directions perpendicular to the length of said arms, said means for providing bending relief being elongated slots formed proximate the anchoring lugs.

17. The retaining strap of claim 11 wherein said central ring has an inner diameter which is fitted over the tubular piston, said central ring having a plurality of tabs extending in the direction of the clutch axis formed on the inner diameter, said tabs each being adapted to be received in a slot formed in the tubular piston.

18. The retaining strap of claim 17 wherein said tabs are received in a slot formed in the clutch release bearing.

19. The retaining strap of claim 11 wherein said central ring has an inner diameter which is fitted over the movable piston, said central ring having a plurality of tabs extending axially relative to the inner diameter and formed on the inner diameter, said tabs each being adapted to be received in a corresponding slot formed in the clutch release bearing.

* * * * *